United States Patent [19]
Pickett

[11] 4,010,810
[45] Mar. 8, 1977

[54] HEAVY DUTY DENIER TYPE BALANCE

[76] Inventor: Victor W. Pickett, 205 Wilson Ave., Kinston, N.C. 28501

[22] Filed: Mar. 19, 1975

[21] Appl. No.: 559,723

[52] U.S. Cl. .............................. 177/157; 177/197; 177/200; 177/263

[51] Int. Cl.² .................. G01G 23/02; G01G 1/24; G01G 19/00; G01G 21/22

[58] Field of Search .......... 177/157, 190, 193, 197, 177/200

[56] References Cited
UNITED STATES PATENTS

| 1,777,881 | 10/1930 | Gilbert | 177/197 X |
| 3,270,558 | 9/1966 | Barrett et al. | 177/157 X |

FOREIGN PATENTS OR APPLICATIONS

| 600,830 | 2/1926 | France | 177/200 |

Primary Examiner—George H. Miller, Jr.

[57] ABSTRACT

A preferred embodiment of this invention is a heavy duty balance particularly adapted to comparative weight denier tubes produced in synthetic fiber plants. This weighing device includes a locking feature for use during loading and unloading of the tubes, an easy to ready comparative weight indicator, and a finger tip zero adjustment.

12 Claims, 7 Drawing Figures

HEAVY DUTY DENIER TYPE BALANCE

In the past, two basic categories of balances have been developed. First, is the heavy duty railroad track and motor truck industrial types scale in which it is not uncommon to have a 200 ton or better capacity. These heavy duty scales by nature are not what could be considered minutely accurate. The second type of balance available has been the analytical balance which can be extremely accurate in comparative weighing but when made capable of the accuracy required in denier tube comparisons, are so fragile as to very quickly get out of adjustment and be useless for this purpose.

In the production of synthetic fibers, an extruding head is usually used which extrudes a plurality of strands at one time. Each individual strand being extruded from the head is usually of a very fine diameter, particularly in the stronger synthetic fibers such as nylon, dacron and the like. The multiple strands extruded from the extruder head pass through a cooling process step and then are at least lightly twisted into a thread as they are wound onto a tube or core. When this tube or core is full, it is referred to as a "denier tube" and is ready to be shipped to textile weaving, spinning, and other types of plants for further processing into fabrics and other products.

On occasion during the extruding process of the synthetic fibers, one or more of the extruding orifices will become clogged thereby running a short count on the number of strands in the thread being wound onto the denier tube. At the end of the winding process, a denier tube with several strands missing from the thread will be lighter than comparable full strand denier tubes.

Also, because of the close proximity of the extruder heads, occasionally one or more strands from one head will be picked up by the adjacent wind-up and thus that denier will be heavier than the average full strand tube.

Because of the extremely large number of denier tubes shipped from the average synthetic fiber manufacturing plant, even the slightest variation in denier weight will be very costly, particularly to the purchaser when the denier tubes run light.

Because of the inter company relationships usually involved, with contracts covering the same, it is considered by all concerned to be much more practical to catch light denier tubes before they leave the synthetic fiber manufacturing plant rather than dealing with breached contracts or refusal-to-accept situations.

Because up to the present time only rugged commerical heavy duty balances or fragile, lightweight analytical balances have been available, accurate determination of light or heavy denier tubes has not been possible. After much research and study into the above mentioned problems, the present invention has been developed to provide a heavy duty, rugged balancing with the accuracy and sensitivity of an analytical balance. Through use of this invention it has been found possible, on a commercial scale, to place denier tubes on each side of the balance and to accurately determine if there is enough difference in the weight to warrant futher testing as to which tube is overweight or underweight. The balance of the present invention will hold up and maintain its sensitivity and accuracy under constant use with denier tubes of up to 100 pounds.

In view of the above, it is an object of the present invention to provide a balance with the ruggedness of the 200 ton railroad track or motor truck industrial type scale with the accuracy and sensitivity of an analytical balance.

Another object of the present invention is to provide an extremely sensitive balance which will maintain its sensitivity even when exposed to the constant shock of heavy load packages.

Another object of the present invention is to provide a balance having the accuracy of an analytical balance but which is capable of handling weights of up to 100 pounds.

An additional object of the present invention is to provide, in a heavy duty balance having an analytical balance sensitivity, a locking mechanism which prevents movement of the balance during loading and unloading and allows movement only during the actual reading of the balance.

A further object of the present invention is to provide in a heavy duty and yet extremely sensitive balance and an easy-to-read weight differential indicator.

An even further object of the present invention is to provide, in a heavy duty and yet sensitive balance, a locking and release mechanism controlled by an easily excessible lever.

Another object of the present invention is to provide, in a heavy duty and yet sensitive balance, a finger-tip zero adjustment for compensating for unlevel supports.

Another object of the present invention is to provide, in a heavy duty and yet accurate balance, a heavy duty, dash pot type damper control.

Another object of the present invention is to provide, in an extremely accurate balance, heavy duty pivots and bearings.

Another object of the present invention is to provide an industrial type, heavy duty and yet extremely accurate balance constructed exclusively of stainless steel and aluminum parts to prevent inaccuracies caused by metal deterioration.

Another object of the present invention is to provide an extremely rugged and yet accurate balance for weighing denier tubes.

Another object of the present invention is to provide, in a denier tube comparative weighing device, an accurate indicator of any comparative weight differential existing.

Other objects and advantages of the present invention will become apparent and obvious from a study of the following description and the accompanying drawings which are merely illustrative of such invention.

Figure 1:
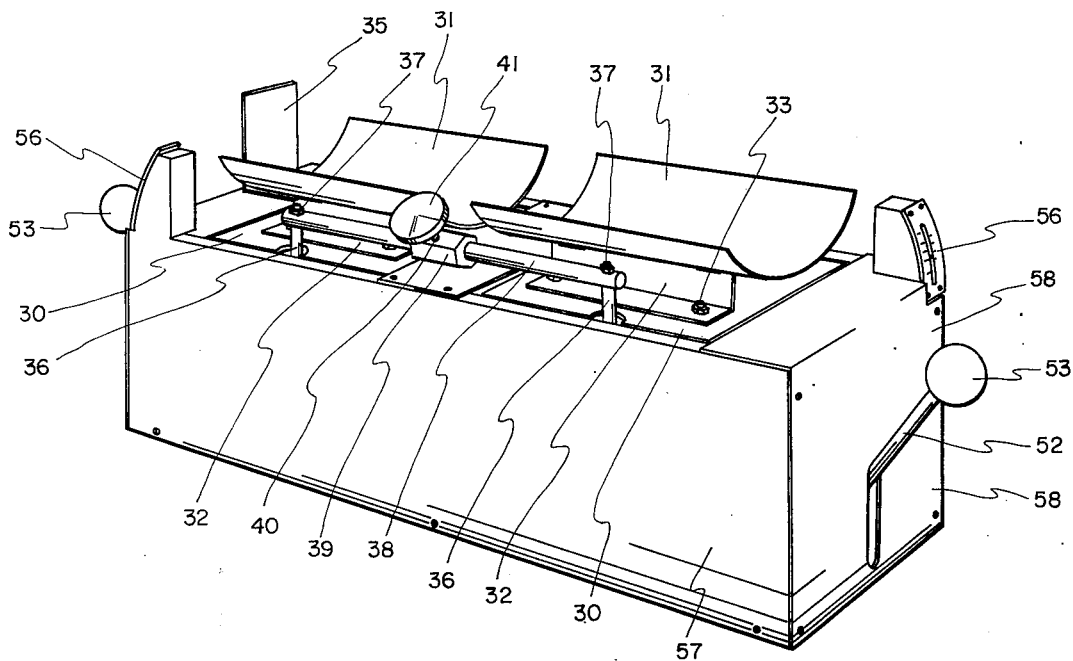
FIG. 1 is a front perspective view of the balance of the present invention.

With further reference to the drawings, the balance of the present invention, indicated generally at 10, includes a base 11 constructed preferably of quarter inch stainless steel. Although it has not been found necessary using this gauge of metal, it is certainly anticipated that angle iron, I-beams or similar structural stiffening members could be used.

A support plate 12 is bolted or otherwise secured to base plate 11. Uprightly disposed main support members 14 are welded or otherwise secured to support plate 12. The upper portion of main support member 14 splits into yoke shaped arms 15 and 16. A pivot block 17 is mounted between the yoke arms 15 and 16 of each of the support members 14 by means such as a screw pin passing through said arms and block. It can be seen that pivot block 17, because of the screw pin, is self-adjusting to allow maximum pivotable surface contact with fulcrum pivot 19.

The fulcrum pivot is preferably in the form of a shaft having beveled sides to form a V or downwardly disposed knife edge in the areas of contact with the self-aligning pivot block 17.

To each end of pivot shaft 19 is fixedly secured a support beam 20. As can clearly be seen in the drawings, these beams are generally horizontally disposed when the device of the present invention is in balance. A third support beam, similar to support beams 20 but somewhat heavier, is fixedly secured to pivot shaft 19 in the center thereof. Connecting plates 22 are bolted or otherwise fixedly secured to support beams 20 and central support beam 21 so that these three beams or rocker arms are as a single unitary structure.

Passing through and fixedly secured at each end of the beams or arms 20 and 21 is a pivot shaft similar to shaft 19 but having its knife edge disposed in the opposite direction, namely, upwardly instead of downwardly.

Each of the pivot shafts 22' carries on its upwardly disposed beveled inverted V or knife edge a self-aligning pivot block 23. The reason these pivot blocks are self-aligning is that pins 24 pass therethrough laterally relative to the axis of the adjacent pivot shaft 22.

Dependingly supported by each of the pivot pins 24 is a pair of downwardly disposed bottom plate hanger brackets 25. The bottom or lower portion of each of these hanger brackets is fixedly secured by means such as bolts 26 to bottom tray support plate 27.

Secured by threaded nuts 28 or other suitable means to bottom plate 27 are a plurality, preferably four, upwardly projecting support columns or shafts 29. Since one of these column shafts is placed near each corner of bottom support plate 27, and further since hangers 25 are generally in the center thereof, an even distribution of weight is accomplished.

An upper tray support plate 30 of generally the same size and configuration as bottom support plate 27 is provided and is adapted to be mounted on the upper ends of support column shafts 29.

A denier tube support tray 31 is provided relative to each of the upper support plates 30. Each of these trays has a pair of flanges 32 fixedly secured thereto which are adapted to fixedly mount said support tray on said support plate by means of support column nuts 33 as seen particularly clear in FIGS. 3 through 5.

If desired, to aid in the loading of the denier tubes shown in dotted lines at 34 into their support trays 31, a stop 35 can be provided.

Fixedly secured to, and upwardly projecting from, the ends of one of the support beams or rocker arms 20 are shafts 36. These, through securing means such as nuts 37, fixedly secure the ends of slide bar 38. An adjusting weight 39 is slidably mounted on slide bar 38 and is axially, adjustably clamped thereon by means such as set screw 40 and its handle 41.

Below support plates 27 are a pair of pivot brackets 42 which are secured to base plate 11 by means such as bolts 44. Pivot pins 45 and 46 secured by cotter keys or other suitable means pivotably mount slave toggle 47 and master toggle 48 to their respective pivot brackets 42.

The end of slave toggle 47 opposite bracket 42 is pivotably secured to balance stop bar 50 by means such as pivot pin 49. A pivot pin 51 attaches the master toggle to the balance stop bar. It should be noted from the FIGS., particularly FIG. 3, that the distance between the pivot pins at each end of both the slave toggle and the master toggle are the same distance thus when the stop or locking handle 52, which is fixedly secured to master toggle 48, is activated, stop bar 50 will move either upwardly or downwardly. A handle 53 is, of course, provided for convenience on the end of lever 52.

To bias the locking or stop bar 50 in its upper or lock engagement position, a pair of springs 66 are provided and are attached by means such as pin 67 to one end of such bar and to base plate 11 by means such as bolts 68 adjacent the opposite end of such bar. Thus it can be seen that the locking bar is always biased toward the balance locking position and such pressure can only be removed by activating lever 52.

Figure 3:
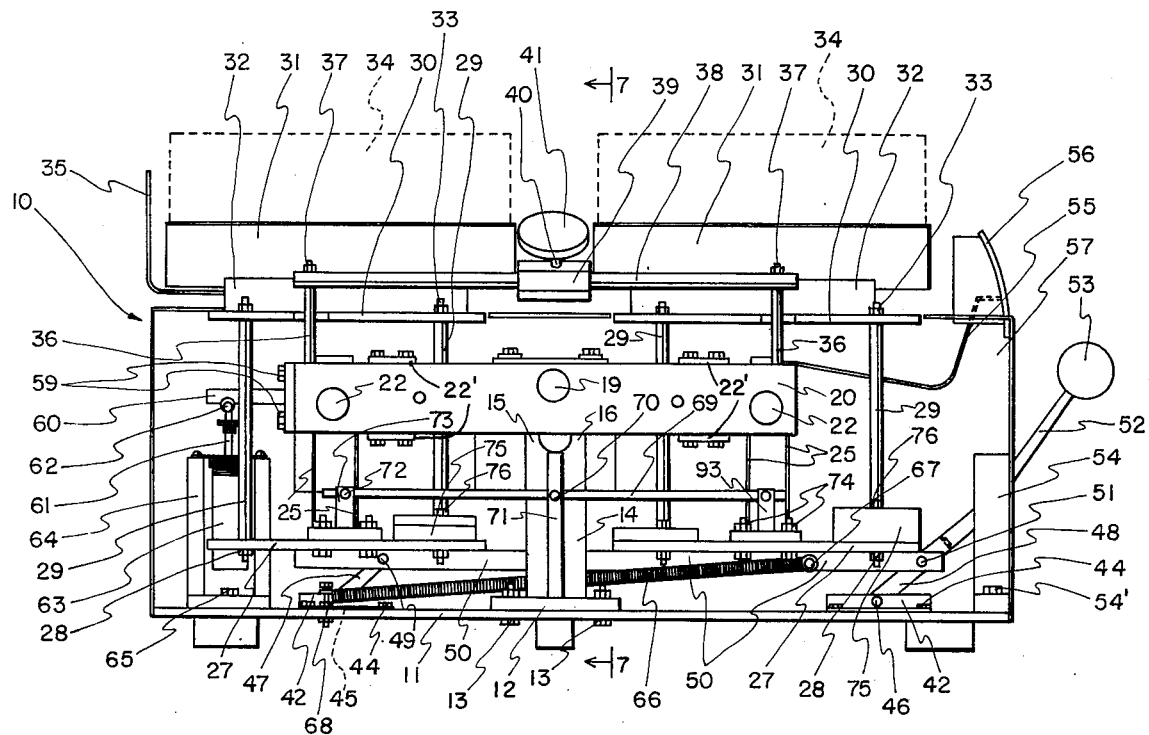
FIG. 3 is a side elevational view of the balance with the housing side removed.
Figure 4:
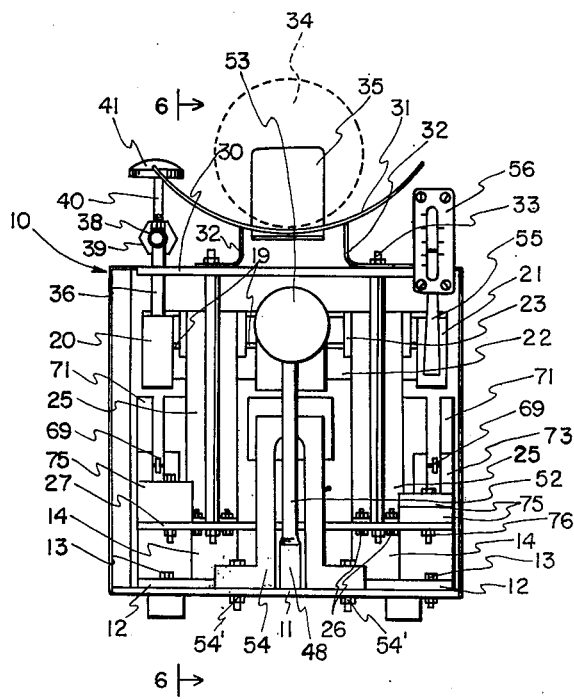
FIG. 4 is an end elevational view of the balance with the end housing removed.
Figure 5:
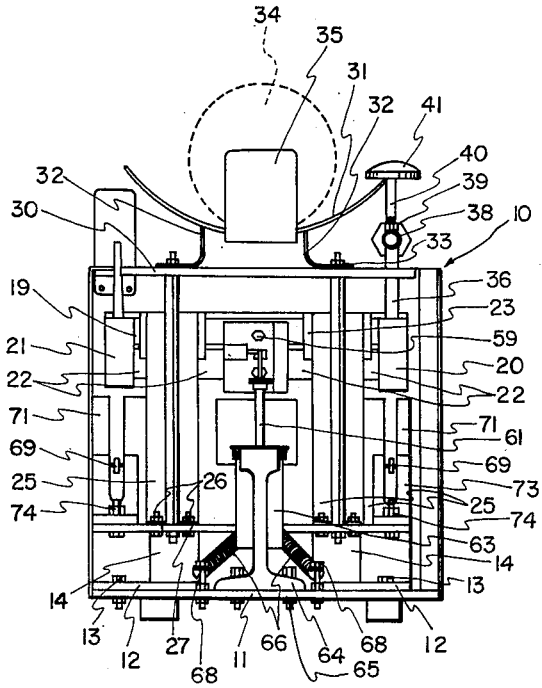
FIG. 5 is an opposite end view of the balance with its housing removed.
Figure 6:
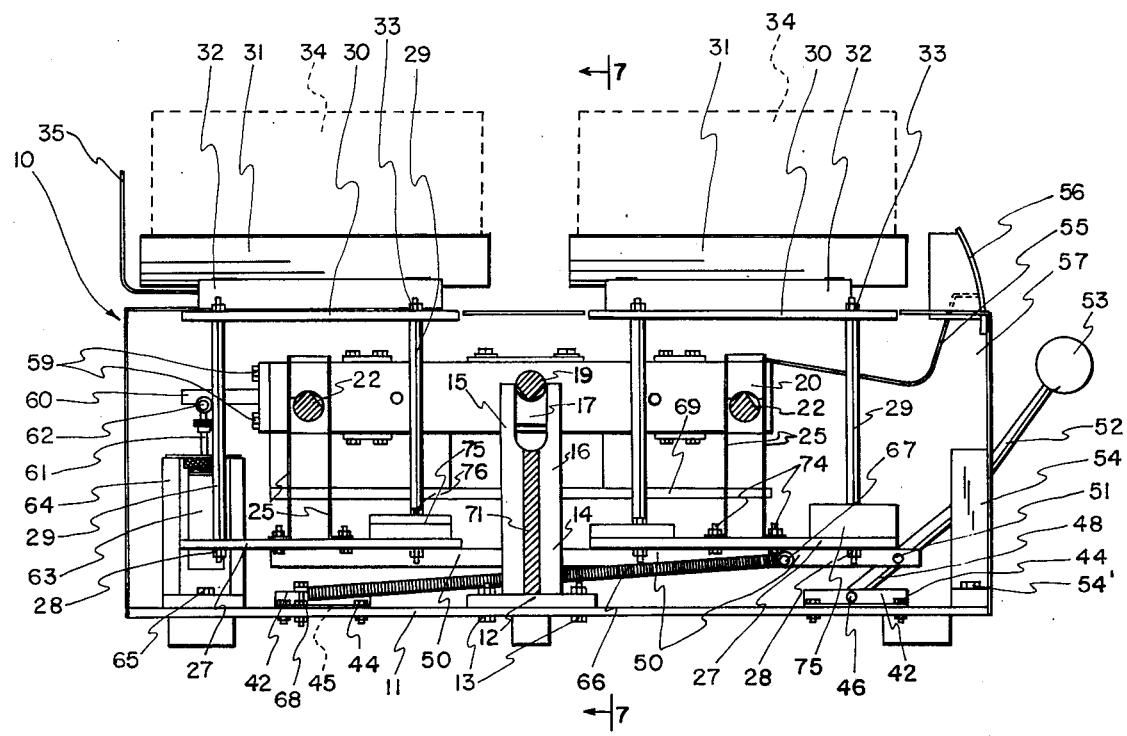
FIG. 6 is a section taken through lines 6—6 of FIG. 4.
Figure 7:
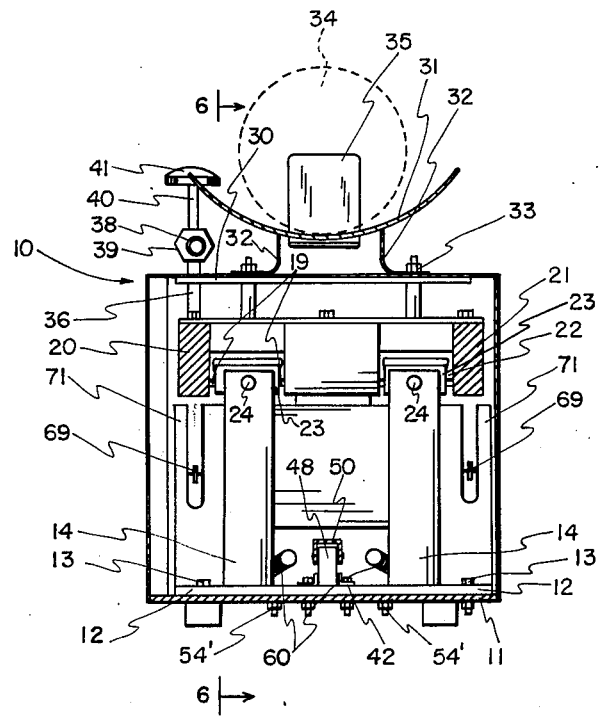
FIG. 7 is a section taken through lines 7—7 of FIG. 3.

To prevent undesired lateral movement of locking lever 52, which from the above description is adapted to move upwardly and downwardly, a generally U-shaped or slotted guide means 54 is provided which is bolted or otherwise secured to base plate 11 as seen clearly in FIGS. 3 and 4.

To give an indication of the amount of movement in the balance of the present invention, a pointer 55 is fixedly secured to the end of one of the support beams 20 and extends to a point adjacent indicator scale 56. This indicator scale can be mounted in any convenient manner on side housing 57 or rear housing 58.

Fixedly secured, by means such as bolts 59, to one end of central support beam 21 is an outwardly extending arm 60. The end of this arm is adapted to pivotably mount dash pot piston rod 61 by means such as pivot pin 62. A standard commercially available dash pot type dampening device 63 is provided and is fixedly mounted on base plate 11 by mounting bracket 64. This bracket is held in place on the base plate by means such as bolts 65.

To prevent undesirable swinging movement of the support plate units relative to each other, parallel arms 69 are provided. Each of these arms is disposed parallel to its adjacent rocker arm 20 and is centrally pivoted about pivot pin 70 which is supported by bracket 71. This bracket is fixedly secured by welding or other means to support member 14. Each end of arm 69 is pivoted about a pin 72 which passes through bracket 73 and is secured to bottom tray support plate 27 by means such as bolts 74. Thus, it can be seen that as the rocker arms pivot back and forth, connected support plates 27 and 30 will remain vertical and move only up and down because of the pivoting guide of parallel arms 69.

To hold the fulcrum points in operative contact with their related members and to prevent the entire balance of the present invention from bouncing and otherwise moving undesirably, a plurality of weights 75 are placed at various convenient points and are secured by means such as bolts 76.

A plurality of feet means 77 are secured to the bottom or lower side of base plate 11 so that the same can be supported on any convenient surface when in use.

Before beginning the weighing operation, lever 52 is usually pulled down releasing locking bar 50 to determine if there is a zero or center reading on scale 56. If this is not the case, handle 41 can be manipulated to loosen set screw 40. Adjustable weight 39 can then be moved axially along slide bar 38 until the proper weight in one direction or another is added so that the indicator scale 56 has a central reading of indicator arm or pointer 55. Set screw 40 is then tightened by means of handle 41 and the weighing operation is ready to progress. Indicator 55 is, of course, set to give a center reading on scale 56 when the locking bar 50 is biased in its uppermost or locked position.

When the balance of the present invention is used, the same is placed on a generally flat surface and is made steady. Locking lever 52 is allowed to move into its upper or blocking position against the bias or springs 60. Locking bar 50 is thus firmly held against plates 27 and the balance is effectively locked against any pivoting movement. Denier tubes or other units between which a comparative weight determination is desired are placed on trays 31. Lever 52 by way of handle 53 is then moved downwardly unlocking bar 50 and allowing free pivoting movement of the entire load on fulcrum 19. This is, of course, transmitted through beams 20 and 21 to pivot shafts 22 as hereinabove connectingly described.

As beam 20 moves up and down, its associated indicator 55 will give a comparative reading on scale 56. To prevent undesirable oscillation dash pot 63 (which is usually oil dampened) can be set in its normal manner for greater or lesser resistance to movement. Since this is a standard commercial item, further description of the same is not deemed necessary.

Once the comparative weight is determined, the products in trays 31 can be removed and additional new products placed therein.

Figure 2:
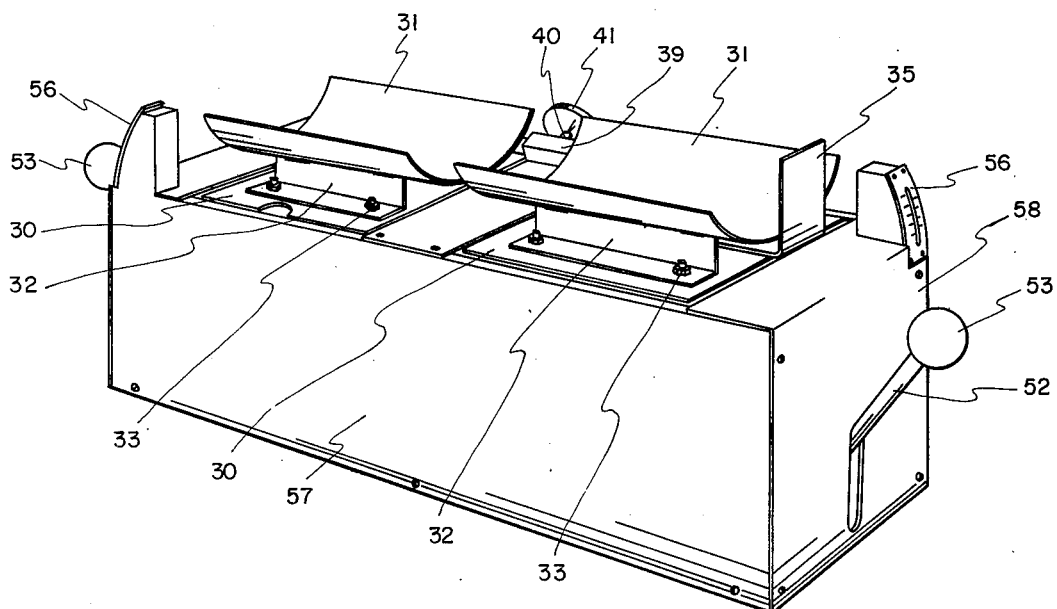
FIG. 2 is a rear perspective view of the same.

Since it is quite often as convenient, if not more convenient, to load denier tubes from both ends of the balance, an indicator and locking lever with its associated toggles and locking bar can be placed at each end of the unit. Since this is only a duplicate of the locking bar and associated lever and mechanisms already described, further description is not deemed necessary since it would only add additional reference to the already crowded figures and would only be redundant. The balance shown in FIGS. 1 and 2, however, have been drawn with locking levers and comparative weight indicators on both ends so that this feature is illustrated.

The side and end housings are formed from sheet metal in the usual manner and are held in place by means such as self-tapping screws. Since no particular inventive concept is seen in this, further detailed description of the same is not deemed necessary.

From the above, it is obvious that the present invention has the advantage of providing a heavy duty and yet extremely accurate balance for commercial use. The present invention also has the advantage of providing an extremely rugged comparative weighing means which does not easily get out of adjustment and when this does occur, provision is made for quick hand adjusted realignment. The terms such as "upper", "bottom", and so forth are used herein merely for convenience to describe the balance and its parts as oriented in the drawings. It is to be understood however, that these terms are in no way limiting to the invention since the balance may obviously on occasion be disposed in different positions.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A balance for comparative weighing of denier tubes and other articles comprising: a base; a main support fixedly secured to said base; a pivot means in operative contact with said support means; at least one elongated rocker arm fixedly secured at its central portion to said pivot means; second and third pivot means fixedly secured one at each end of said rocker arm; a hanger means suspended from each of said second and third pivot means; a lower plate means fixedly secured to each of said hanger means; an upper plate means fixedly secured in spaced relation to each of said lower plate means whereby, when two separate articles are placed one each on said upper plates, the weight differential, if any, between said articles can be determined; and a toggle actuated locking bar means disposed between said base and said lower plate means for preventing relative movement therebetween when so desired.

2. The balance of claim 1 wherein the toggle actuated locking bar is operable from at least two remote locations.

3. The balance of claim 1 wherein an indicator is provided for direct reading of the weight differential, if any, between said articles.

4. The balance of claim 1 wherein a damper means is operatively connected between said rocker arm and said base whereby undesirable and possibly damaging oscillation can be prevented.

5. The balance of claim 1 wherein a support tray is provided for each of the upper plates whereby said articles can be more easily supported.

6. The balance of claim 1 wherein self-aligning bearing blocks are provided in conjunction with each of said pivot means.

7. The balance of claim 1 wherein the toggle actuated locking bar is biased toward the locked position.

8. The balance of claim 7 wherein the biasing means is at least one coil type spring.

9. The balance of claim 1 wherein a fine adjustment is provided to centralize said balance prior to comparative weighing.

10. The balance of claim 9 wherein the fine adjustment is a releasably secured slidable weight.

11. The balance of claim 1 wherein the lower plates are hingedly connected whereby undesirable swinging one relative to the other is prevented.

12. The balance of claim 11 wherein the means for preventing undesirable relative movement between the lower plates is also pivotably connected to said base.

* * * * *